US012031496B2

(12) United States Patent
Schroth et al.

(10) Patent No.: US 12,031,496 B2
(45) Date of Patent: Jul. 9, 2024

(54) METHOD AND DEVICE FOR DIAGNOSING AN INTERNAL COMBUSTION ENGINE OF A POWERTRAIN

(71) Applicant: Vitesco Technologies GmbH, Regensburg (DE)

(72) Inventors: Stefan Schroth, Wörth (DE); Heiko Herzig, Tegernheim (DE)

(73) Assignee: Vitesco Technologies GmbH, Regensburg (DE)

( * ) Notice: Subject to any disclaimer, the term of this patent is extended or adjusted under 35 U.S.C. 154(b) by 0 days.

(21) Appl. No.: 18/468,842

(22) Filed: Sep. 18, 2023

(65) Prior Publication Data

US 2024/0003311 A1 Jan. 4, 2024

Related U.S. Application Data

(63) Continuation of application No. PCT/EP2021/086829, filed on Dec. 20, 2021.

(30) Foreign Application Priority Data

Mar. 18, 2021 (DE) .................... 10 2021 202 655.9

(51) Int. Cl.

*F02D 41/22* (2006.01)
*F02D 41/00* (2006.01)
*F02D 41/02* (2006.01)

(52) U.S. Cl.

CPC ......... *F02D 41/222* (2013.01); *F02D 41/008* (2013.01); *F02D 41/0225* (2013.01); *F02D 2200/50* (2013.01); *F02D 2250/14* (2013.01)

(58) Field of Classification Search

CPC .. F02D 41/222; F02D 41/008; F02D 41/0225; F02D 2200/50; F02D 2250/14; B60W 10/06; B60W 10/11

See application file for complete search history.

(56) References Cited

U.S. PATENT DOCUMENTS 10,267,256 B1 * 4/2019 Dudar .................. F02D 41/222
2003/0163242 A1 8/2003 Miyauchi (Continued)

FOREIGN PATENT DOCUMENTS

DE 102018116362 A1 * 1/2019 ............ B60W 10/06
DE 102018207176 A1 11/2019

(Continued)

OTHER PUBLICATIONS

International Search Report and Written Opinion dated Apr. 20, 2022 from corresponding International Patent Application No. PCT/EP2021/086829.

(Continued)

*Primary Examiner* — Edwin A Young

(57) ABSTRACT

The disclosure relates to a method and a device for diagnosing an internal combustion engine of a powertrain. The powertrain includes the internal combustion engine and a transmission unit, and the diagnosis is carried out using a running irregularity signal, where potentially a gear change is actively requested. The method includes ascertaining a diagnostic value of the internal combustion engine during operation using the running irregularity signal of the internal combustion engine. The powertrain is operated using a diagnostic gear of the transmission unit. The method also includes detecting the diagnostic gear which is engaged in the transmission unit while ascertaining the diagnostic value; and comparing the ascertained diagnostic value with a predefined diagnostic threshold value and comparing the diagnostic gear of the transmission unit with at least one predefined gear of the transmission unit.

16 Claims, 4 Drawing Sheets

(56) References Cited

U.S. PATENT DOCUMENTS

| | | | | |
|---|---|---|---|---|
| 2005/0115759 | A1 | 6/2005 | Langer | |
| 2009/0326787 | A1 | 12/2009 | Hofmeister | |
| 2014/0014081 | A1 | 1/2014 | Azadeh | |
| 2016/0017827 | A1 * | 1/2016 | Jammoussi | F02D 41/222 701/105 |
| 2017/0037800 | A1 | 2/2017 | Sugimoto | |

FOREIGN PATENT DOCUMENTS

| | | | | |
|---|---|---|---|---|
| DE | 102018208233 | A1 | 11/2019 | |
| EP | 0818683 | B1 | 1/1998 | |
| FR | 2982675 | A1 * | 5/2013 | F02D 41/009 |

OTHER PUBLICATIONS

German Office Action dated Sep. 2, 2021 for corresponding German Patent Application No. 10 2021 202 655.9.

* cited by examiner

METHOD AND DEVICE FOR DIAGNOSING AN INTERNAL COMBUSTION ENGINE OF A POWERTRAIN

CROSS-REFERENCE TO RELATED APPLICATIONS

This application claims the benefit of International Application PCT/EP2021/086829, filed Dec. 20, 2021, which claims priority to German Application 10 2021 202 655.9, filed Mar. 18, 2021. The disclosures of the above applications are incorporated herein by reference.

TECHNICAL FIELD

The disclosure relates to a method and a device for diagnosing an internal combustion engine of a powertrain, where the powertrain has the internal combustion engine and a transmission unit, and the diagnosis is carried out using a running irregularity signal.

BACKGROUND

In modern internal combustion engines, a running irregularity signal is formed for each cylinder, that is to say cylinder-specifically, on the basis of engine speed information. This cylinder-specific signal reflects a torque contribution of the cylinder in question to the overall torque power of the internal combustion engine and to the torque profile of the internal combustion engine.

A closed powertrain of a vehicle acts on these signals as disturbance variable. The closed powertrain is then present, for example, if a coupling of the powertrain is closed, and accordingly the torque of the internal combustion engine is transferred to the drive axle or to the drive wheels. Accordingly, roadway unevenness or other disturbance variables, which act on the drive wheels and accordingly on the drive axle, would act against rearwards the torque direction as far as the internal combustion engine. Accordingly, these signals act on the running irregularity signal in the case of the closed powertrain as disturbance variables. Such disturbance variables are of high frequency under most operating conditions of the internal combustion engine or the entire powertrain. In conventional internal combustion engines and in the case of a conventional running irregularity signal evaluation, high-frequency disturbance variables of this kind are effectively filtered out using a corresponding signal conditioning.

However, with certain transmission ratios, a low-frequency oscillation effect may occur as disturbance variable.

For diagnosis of the individual cylinders of the internal combustion engine, the filtered running irregularity signal is used in the engine control to identify differences between the individual cylinders in relation to the air/fuel mixture. Here, each cylinder is made leaner progressively in succession (an injection volume is reduced). The corresponding running irregularity signal thus deteriorates on account of the leaning of the particular cylinder. For diagnosis of the cylinder in question, a ratio between leaning and change or deterioration of the corresponding running irregularity signal can then be formed in order to assess the cylinder in question and correct it if necessary. If the diagnosis of the particular cylinder exceeds or drops below a predefined threshold value, a fault memory entry can be input in an engine control unit, which in turn can be displayed to a driver of the vehicle, showing that a vehicle repair is necessary.

With certain transmission ratios of a transmission unit of the powertrain, the low-frequency oscillation effect superimposes this ratio formation and thus increases the inaccuracy of the results of the diagnosis. This increase in the inaccuracy may mean that fault-free cylinders are classified as faulty, and accordingly an unauthorized fault store entry may be input in the engine control unit although the system and the powertrain are not defective.

SUMMARY

One aspect of the disclosure provides a method for diagnosing an internal combustion engine of a powertrain having the steps listed below. The powertrain has an internal combustion engine and a transmission unit. The internal combustion engine is configured to provide the torque to the powertrain, and the transmission unit is configured to provide the desired ratio to a drive axle of the powertrain, so that the torque or the speed can be transferred as desired to the drive axle or the drive wheels. The diagnosis of the internal combustion engine is carried out using a running irregularity signal. The running irregularity signal reflects a torque contribution of various cylinders to the overall torque of the internal combustion engine, whereby an assessment or the diagnosis of the internal combustion engine or the individual cylinders of the internal combustion engine is possible using this running irregularity signal.

In some examples, the method includes ascertaining a diagnostic value of the internal combustion engine during operation using the running irregularity signal of the internal combustion engine, where the powertrain is operated using a diagnostic gear of the transmission unit. According to this first-mentioned step, the diagnostic value which diagnoses the internal combustion engine is ascertained during operation of the internal combustion engine on the basis of the running irregularity signal. During operation of the internal combustion engine, an arbitrary gear of the transmission unit is engaged. Accordingly, the transmission unit is operated with this arbitrary gear, the diagnostic gear. If, for example, the transmission unit has five, six or seven different gears, which each offer a different ratio, the gear that is engaged in the transmission unit when the diagnostic value of the internal combustion engine is ascertained is the diagnostic gear. Accordingly, the diagnostic gear can differ according to the moment in time or time period or operating mode of the internal combustion engine or the powertrain.

Additionally, the method also includes detecting the diagnostic gear which is engaged in the transmission unit while ascertaining the diagnostic value. According to this method step, the diagnostic gear is detected that was available in the transmission unit when ascertaining the diagnostic value, whereby the corresponding ratio was provided.

Additionally, the method also includes comparing the ascertained diagnostic value with a predefined diagnostic threshold value and comparing the diagnostic gear of the transmission unit with at least one predefined gear of the transmission unit. According to this method step, the ascertained diagnostic value is firstly compared with a predefined diagnostic threshold value. For example, it is examined here whether the diagnostic value exceeds or drops below the diagnostic threshold value. It is also conceivable that the diagnostic threshold value is a limit band, and the diagnostic value is compared to ascertain whether the diagnostic value breaks out from the limit band of the diagnostic threshold value. According to this method step, it is then compared, where an order is irrelevant, however, whether the diagnostic gear of the transmission unit that was engaged whilst ascertaining the diagnostic value corresponds to a predefined gear of the transmission unit. It is examined here whether or not the diagnostic gear matches at least one of the predefined gears of the transmission unit. The diagnostic threshold value and the predefined gear of the transmission unit can be determined, for example, during the development of the powertrain and stored in a memory, where they are used accordingly for the comparison according to this method step.

Additionally, the method also includes identifying that the diagnosis of the internal combustion engine is reliable and there is a fault of the internal combustion engine if the ascertained diagnostic value exceeds the predefined diagnostic threshold value and at the same time the diagnostic gear of the transmission unit differs from all of the predefined gears of the transmission unit. The comparison of the ascertained diagnostic value with the predefined diagnostic threshold value accordingly delivers a result as to whether there is a fault of the internal combustion engine. The comparison of the diagnostic gear of the transmission unit with the at least one predefined gear accordingly delivers a result as to whether or not the ascertained diagnosis is reliable. Accordingly, if the diagnostic gear of the transmission unit is different from all of the predefined gears of the transmission unit, i.e., a different gear from the predefined gears, then the diagnosis of the internal combustion engine is reliable, and the ascertained fault of the internal combustion engine corresponds to an actual, existing fault case. Accordingly, a fault entry may be made.

Additionally, the method also includes identifying that the diagnosis of the internal combustion engine is unreliable if the ascertained diagnostic value exceeds the predefined diagnostic threshold value and at the same time the diagnostic gear of the transmission unit corresponds to one of the predefined gears of the transmission unit. According to this case, it is identified that the diagnosis of the internal combustion engine is implausible if the ascertained diagnostic value exceeds the predefined diagnostic threshold value, thus correspondingly there is potentially a fault, but at the same time the diagnostic gear of the transmission unit corresponds to one of the predefined gears of the transmission unit, thus during the ascertainment of the diagnostic value a gear was engaged in the transmission unit which corresponds to one of the predefined gears. By way of the two last-mentioned method steps, a plausibility check of the ascertained diagnostic value is accordingly carried out by examining which gear of the transmission unit was engaged during the ascertainment of the diagnostic value. If the ascertained diagnostic value exceeds the predefined diagnostic threshold value, it is then examined accordingly whether the gear that was engaged in the transmission unit during the determination of the diagnostic value corresponds to one of the gears that were excluded for the ascertainment of the diagnostic value.

The disclosure provides a method and a device with which a reliable diagnosis of an internal combustion engine of a powertrain is possible.

In some implementations, a fault entry is only made if the diagnosis of the internal combustion engine is reliable and a diagnosed fault is thus most likely actually due to a fault in the internal combustion engine. Accordingly, the low-frequency oscillation effects which occur more frequently with the predefined gears of the transmission unit and which would lead to a false diagnosis can be excluded, whereby overall the diagnosis of the internal combustion engine can be carried out in an advantageously robust and reliable manner.

In some examples, the ascertainment of the diagnostic value is repeated if a gear change has been performed by way of the transmission unit, and where it is identified that the diagnosis of the internal combustion engine is reliable and there is a fault if the diagnostic value ascertained during the repetition exceeds the predefined diagnostic threshold value and at the same time the diagnosis of the transmission unit differs from all of the predefined gears of the transmission unit. For example, if a diagnosis is increasingly performed and it is identified that the diagnosis is unreliable or unreliable because the diagnostic gear of the transmission unit present during this diagnosis matches one of the predefined gears of the transmission unit, then the ascertainment of the diagnostic value is repeated when a gear change has been performed, for example due to a change in operation of the drive unit or due to a change in speed. The thus newly determined diagnostic value is then examined again here to determine whether it is reliable and whether a fault actually exists by comparing the ascertained diagnostic value with the predefined diagnostic threshold value, where it is identified that a fault exists if the ascertained diagnostic value exceeds the predefined diagnostic threshold value and at the same time the diagnostic gear of the transmission unit differs from all of the predefined gears of the transmission unit. Accordingly, due to the gear change, this new diagnostic gear differs from the diagnostic gear that was engaged during the previous ascertainment of the diagnostic value. Accordingly, by performing a second ascertainment of the diagnostic value, it can be identified whether there is actually a fault of the internal combustion engine. In some examples, the identification that the diagnosis of the internal combustion engine is unreliable can be used by performing the diagnosis again when a different gear is present in the transmission unit. Accordingly, if the diagnosis now performed is reliable, and the diagnostic value ascertained exceeds the predefined diagnostic threshold value, then an internal combustion engine fault is indeed present, and a corresponding fault entry is justified. According to this example, the diagnosis of the internal combustion engine can be performed reliably and robustly.

In some implementations, a gear change request is actively sent to the transmission unit if the ascertained diagnostic value exceeds the predefined diagnostic threshold value and at the same time the diagnostic gear of the transmission unit corresponds to one of the predefined gears of the transmission unit. Accordingly, an unreliable result or a diagnosis not performed under reliable conditions because the diagnostic gear of the transmission unit corresponds to one of the predefined gears of the transmission unit is used by identifying that there is potentially a fault case. However, to turn the unreliable result into a reliable one, a gear change is requested in order to investigate whether the ascertained diagnostic value continues to exceed the predefined diagnostic threshold value even if the gear is different, whereupon it is identified that the diagnosis is reliable and, accordingly, that a fault is indeed present. The request for the active gear change may be requested, for example, from an engine control unit to a transmission control unit. Provided that such a gear change can be performed without traction interruption or without noticeable changes to the powertrain that the driver might possibly detect, the corresponding gear change can then be performed immediately by the transmission unit, whereby the diagnosis can be checked for plausibility as to whether the diagnostic value actually exceeds the predefined diagnostic threshold value and a fault is actually present. According to this example, a new diagnosis can be carried out relatively quickly by way of the active gear change, whereby it is advantageously quickly recognized whether or not there is actually a fault.

In some implementations, the predefined gears are blocked by way of the transmission unit until the ascertainment of the diagnostic value is completed in a gear different from the predefined gears. According to this example, the predefined gears are blocked by way of the transmission control unit of the transmission unit so that the transmission unit cannot be operated in the corresponding gears, in other words, the corresponding gears cannot be engaged until the diagnostic value is ascertained. Due to the fact that the predefined gears cannot be engaged, the ascertained diagnosis is reliable, so that, if the diagnostic value is exceeded by the corresponding predefined diagnostic threshold value, the result is reliable and accordingly a fault is actually present. According to this example, a reliable diagnosis of the internal combustion engine can accordingly be performed comparatively easily and quickly.

In some implementations, the gear change and/or the gear block of the transmission unit are performed in dependence on the driver requirements or the powertrain requirements. For example, if the driver requests a corresponding load change, for example due to a desired strong acceleration, then it may be necessary for the transmission unit to be operated in corresponding gears that actually correspond to the predefined gears. Accordingly, the execution of the diagnosis can be stopped when a gear is engaged that corresponds to the predefined gears of the transmission unit. However, provided that the driver requirements again permit a change to gears of the transmission unit that do not correspond to the predefined gears, the diagnosis can be continued, thus allowing a reliable diagnosis to be performed.

In some implementations, a cylinder-specific diagnostic value is determined for each individual cylinder of the internal combustion engine by way of a cylinder-specific running irregularity signal. According to this implementation, a cylinder-specific running irregularity signal is provided, whereby a corresponding cylinder-specific diagnostic value can be ascertained. It is possible to provide a cylinder-specific running irregularity signal so that a corresponding diagnosis of the corresponding cylinder of the internal combustion engine can be performed using this corresponding running irregularity signal for the cylinder in question. Accordingly, a diagnosis can be made for each of the individual cylinders of the internal combustion engine using the respective cylinder-specific running irregularity signal, so that a statement can be made accordingly as to which of the cylinders has a fault, if the internal combustion engine as a whole has a fault. Accordingly, in accordance with this example, the diagnosis can additionally be carried out advantageously accurately.

In some examples, during a predefined first time period, one of the cylinders of the internal combustion engine is made leaner in comparison to the other cylinders of the internal combustion engine and the running irregularity signal detected during this first time period is used to ascertain the diagnostic value of the corresponding cylinder. A cylinder is made leaner by successively reducing the fuel supply to the particular cylinder compared to the other cylinders. As a result, this corresponding cylinder makes a smaller torque contribution to the overall torque of the internal combustion engine compared with the other cylinders. This leaning of the corresponding cylinder results in torque fluctuations which can be read out from the corresponding running irregularity signal. A ratio between the corresponding cylinder leaning and a change in the running irregularity signal (for example amplitude increase) is used to evaluate the corresponding cylinder. Accordingly, a cylinder-specific diagnosis, which is advantageously accurate, can be carried out by way of the leaning.

In some implementations, an entry is made in a fault memory if it is identified that the diagnosis of the internal combustion engine is reliable and a fault is present, i.e., the diagnosis value exceeds the predefined diagnostic threshold value, and where the entry is omitted from the fault memory if it is identified that the diagnosis of the internal combustion engine is unreliable, i.e., the diagnosis value exceeds the predefined diagnostic threshold value, but at the same time the diagnostic gear also corresponds to one of the predefined gears.

Another aspect of the disclosure provides a device for diagnosing an internal combustion engine of a powertrain. The powertrain has the internal combustion engine and a transmission unit and the diagnosis is performed by way of a running irregularity signal, The device includes a control unit designed to control one of the aforementioned methods. The device may be a control unit of the powertrain. In some examples, the device is a separate part of a control unit or is provided as an additional control unit for explicit control. For example, the device may be an engine control unit, which is for controlling the internal combustion engine. The device can also be, for example, a combination of the engine control unit and the transmission control unit.

The details of one or more implementations of the disclosure are set forth in the accompanying drawings and the description below. Other aspects, features, and advantages will be apparent from the description and drawings, and from the claims.

DESCRIPTION OF DRAWINGS

Like reference symbols in the various drawings indicate like elements.

DETAILED DESCRIPTION

Figure 1:
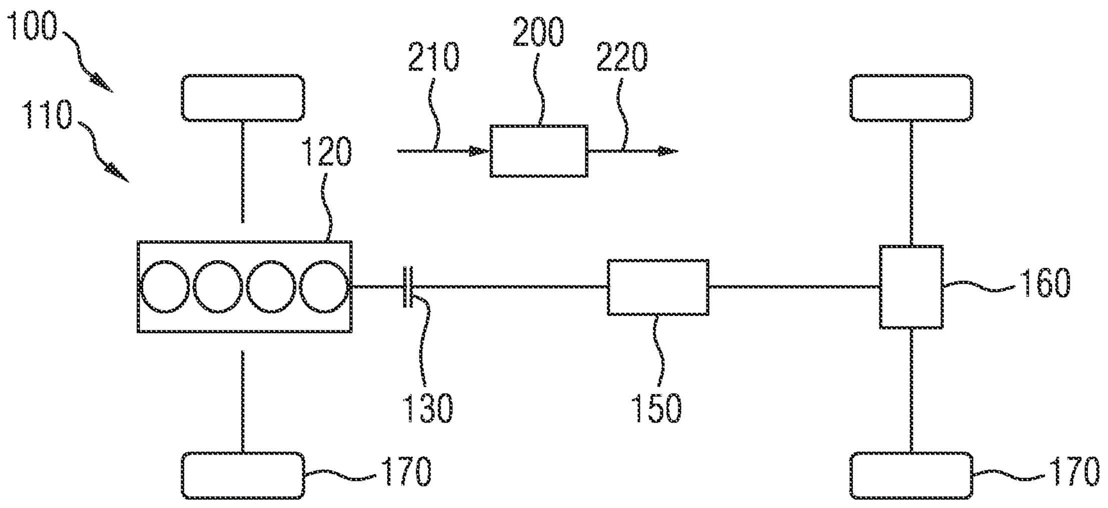
FIG. 1 shows a schematic illustration of an exemplary powertrain of a vehicle.

FIG. 1 shows a powertrain 100 in a schematic representation. The powertrain 100 has an internal combustion engine 110, which has an engine block 120 with four cylinders. The powertrain 100 additionally has a clutch 130 and a transmission 150. The clutch 130 is arranged between the internal combustion engine 110 and the transmission 150. The powertrain 100 additionally has a differential transmission 160, which transmits the torque supplied from the transmission 150 to the differential transmission 160 to a drive axle and, accordingly, to wheels 170.

In FIG. 1, a control unit 200 is additionally shown schematically, which is provided with input signals 210 and outputs output signals 220 for controlling the powertrain 100. The input signals 210 can, for example, be sensor data from sensors arranged in the powertrain 100.

Figure 2:
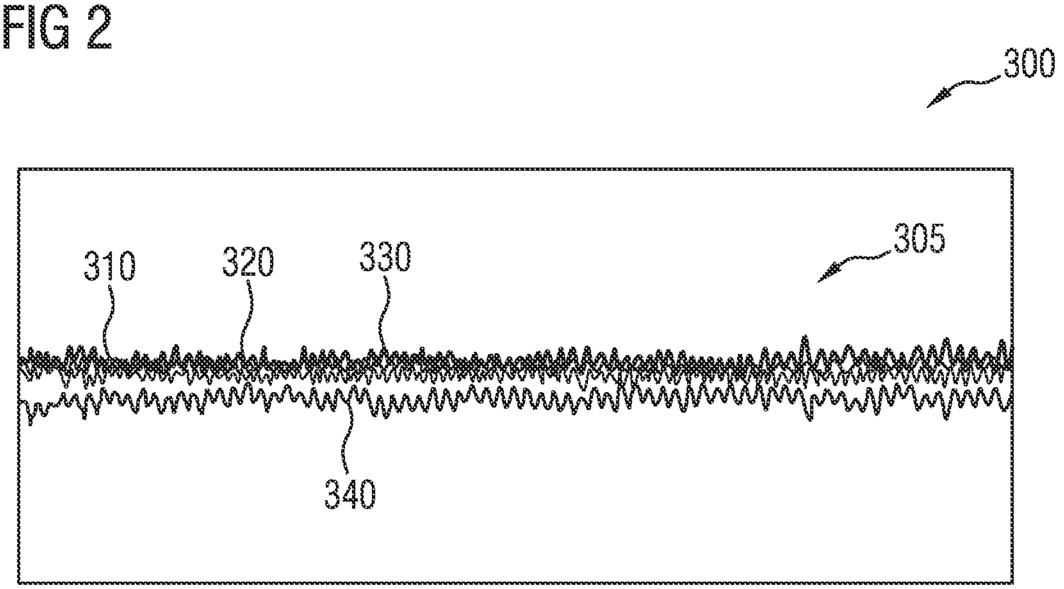
FIG. 2 shows a first exemplary diagram with cylinder-specific running irregularity signals according to a first example.

FIG. 2 shows a first diagram 300 depicting cylinder-specific running irregularity signals 305. The cylinder-specific running irregularity signals 305 are shown in the first diagram 300 over time. In this regard, the first diagram 300 shows a first filtered running irregularity signal of the first cylinder 310, a first filtered running irregularity signal of the second cylinder 320, a first filtered running irregularity signal of the third cylinder 330, and a first filtered running irregularity signal of the fourth cylinder 340. These running irregularity signals 310-340 were recorded at an internal combustion engine speed of approximately 2000 rpm and in a corresponding gear of the transmission unit 150. The corresponding gear according to this example was seventh gear. When the clutch 130 is closed, disturbances which are transferred from the wheels 170 to the powertrain 100, for example by potholes or imbalances, act like disturbance variables on the cylinder-specific running irregularity signals 305. However, these disturbance variables, if they are of high frequency, can be effectively filtered out by appropriate signal conditioning. The cylinder-specific running irregularity signals 305 shown in the first diagram 300 show corresponding filtered running irregularity signals 310-340; accordingly, it is evident from the first diagram 300 that the high-frequency disturbance variables which act on the internal combustion engine through the closed powertrain 100 are not reflected in the corresponding filtered running irregularity signals of the cylinders 310-340.

Figure 3:
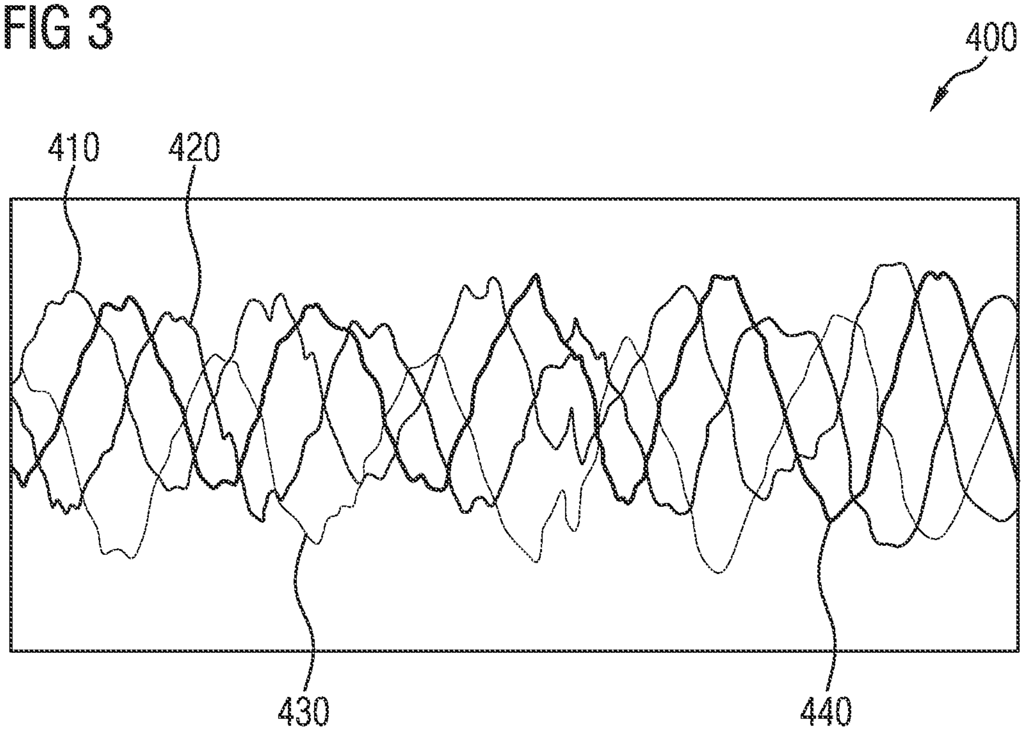
FIG. 3 shows a second exemplary diagram with cylinder-specific running irregularity signals according to a second example.

FIG. 3 shows a second diagram 400, in which, here too, cylinder-specific running irregularity signals also shown over time. Accordingly, the second diagram 400 shows a second filtered running irregularity signal of the first cylinder 410, a second filtered running irregularity signal of the second cylinder 420, a second filtered running irregularity signal of the third cylinder 430, and a second filtered running irregularity signal of the fourth cylinder 440. These second running irregularity signals 410-440 were detected during a time period during which the internal combustion engine was operated at approximately 2000 rpm and the gear engaged in the transmission unit 150 was eighth gear. The disturbance variables introduced to the powertrain 100 by the operation of the powertrain 100 are low-frequency disturbance variables due to the transmission ratio of the eighth gear. Accordingly, in accordance with this example, if the eighth gear is engaged in the transmission unit 150, a corresponding low-frequency oscillation effect occurs in the powertrain 100, which cannot be filtered out by corresponding filtering of the running irregularity signal. Accordingly, the running irregularity signals 410-440 according to this example exhibit comparatively large deflections compared to the running irregularity signals from the first diagram 300. In other words, the second filtered running irregularity signals 410-440 have a larger amplitude compared to the first filtered running irregularity signals 310-340. If the second filtered running irregularity signals 410-440 are used to diagnose the corresponding cylinders of the internal combustion engine 110, corresponding misdiagnoses would be made, which in turn would cause the internal combustion engine 110 to be diagnosed as faulty even though the internal combustion engine 110 does not have a fault.

Figure 4:
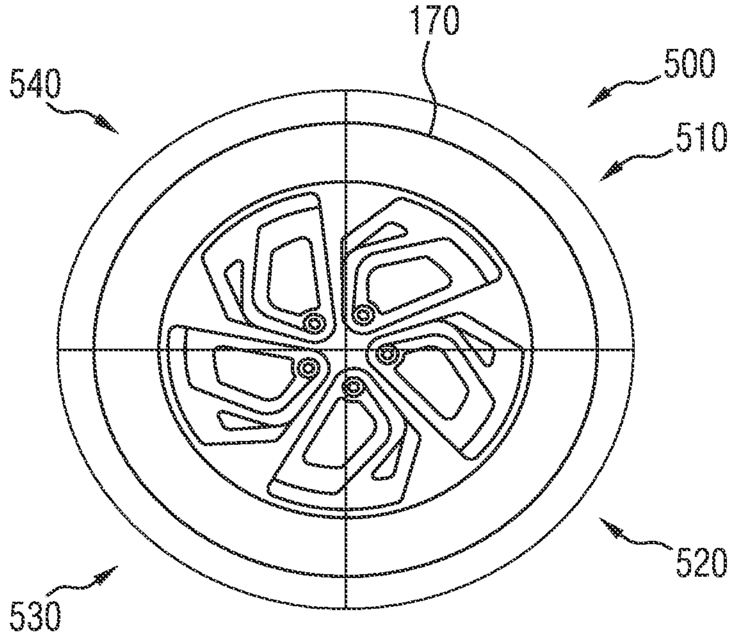
FIG. 4 shows a schematic diagram of a drive wheel.

FIG. 4 shows a third diagram 500 schematically illustrating a drive wheel 170 divided into a plurality of segments. Accordingly, the third diagram 500 shows a first segment 510, a second segment 520, a third segment 530 and a fourth segment 540. By way of FIG. 4, the cause of the low-frequency disturbance variables is explained. A working cycle (two revolutions of the internal combustion engine 110) in a four-cylinder internal combustion engine 110 consists of four segments (segments: number of cylinders in the internal combustion engine for one working cycle). With a final or total transmission ratio of 1:2, the drive wheel 170 rotates once while the internal combustion engine 110 has completed two revolutions. Thus, each active cylinder of the internal combustion engine 110 sweeps the exact same segment 510-540 on the drive wheel 170.

In other words, in such a situation with the appropriate transmission ratio, correspondingly the first cylinder would always sweep the first segment 510, the second cylinder would always sweep the second segment 520, the third cylinder would always sweep the third segment 530, and the fourth cylinder would always sweep the fourth segment 540. However, if the overall transmission ratio deviates only slightly from the integral ratio, the assignment of the corresponding segments 510-540 to the drive gear 170 shifts slowly with each revolution. This shift and the fact that, due to tolerances, the assignment is never exactly the same causes the low-frequency oscillation effect. With this low-frequency oscillation effect, the frequency of the oscillation that occurs is directly proportional to the deviation of the transmission ratio from the integral ratio (for example: very slow oscillations at 1:2.01 and very fast oscillations at 1:2.1). The amplitude of these oscillations is amplified if the powertrain has an imbalance, which is amplified, for example, by a poorly balanced drive wheel 170 or due to a loss of balance weights.

Figure 5:
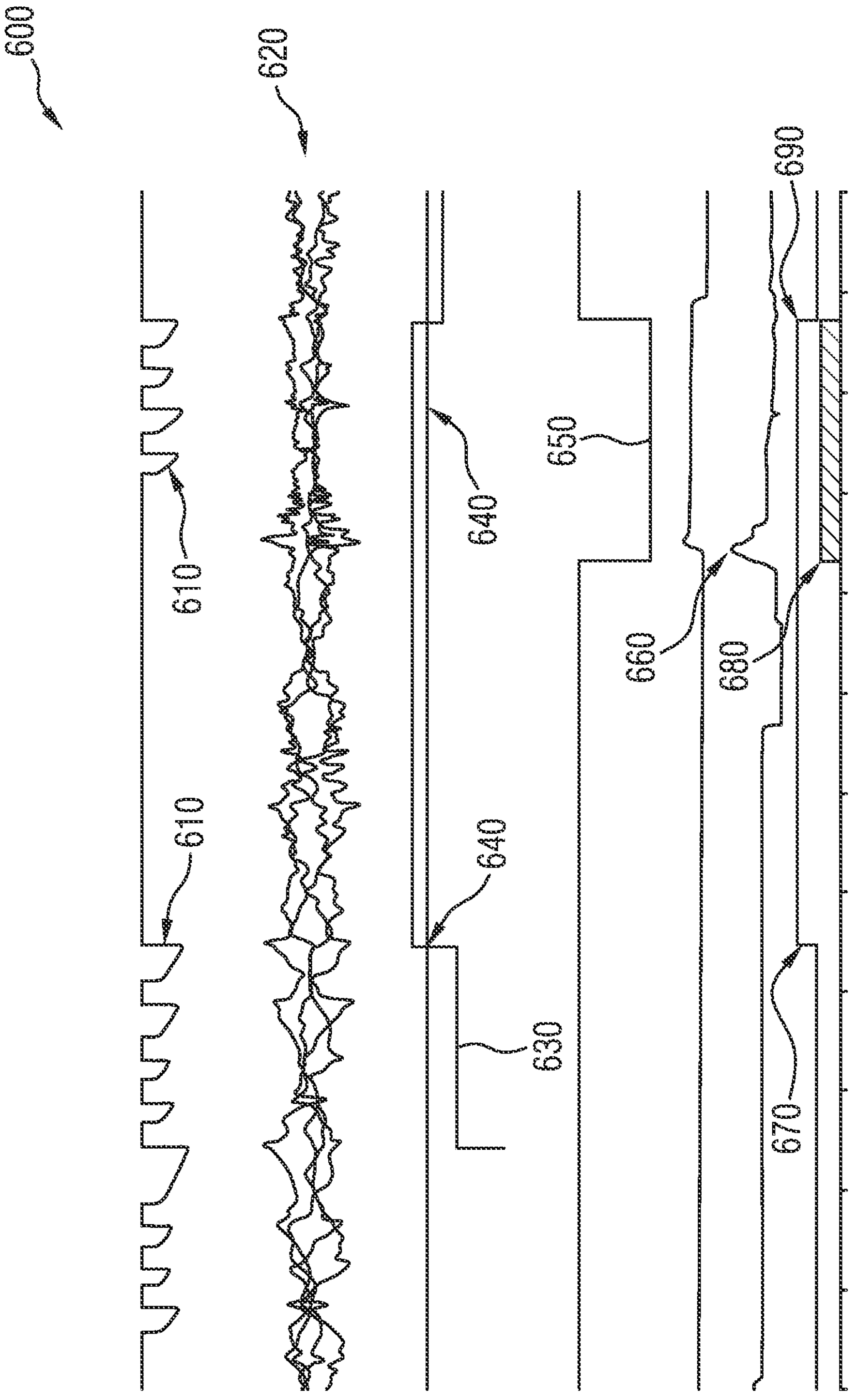
FIG. 5 shows a third exemplary diagram with different profiles and different operating parameters of a powertrain.

FIG. 5 shows a fourth diagram 600 illustrating various operating parameters of the internal combustion engine 110 (not shown). From the fourth diagram 600, the course of the method according to the present disclosure is additionally apparent. In the upper region of the fourth diagram 600, the diagnostic function 610 is shown over time. Based on the deflections from the profile, it can be seen that when the profile has a downward deflection, the corresponding diagnostic function 610 for diagnosing the internal combustion engine 110 is active. Below the diagnostic function 610, the running irregularity signals 620 of the respective cylinders of the internal combustion engine 110 are shown. Below the running irregularity signals 620, on the one hand, the diagnostic value 630, which was determined by way of the running irregularity signals 620, is apparent. In the same portion, a diagnostic threshold value 640 is also shown. As soon as the diagnostic value 630 exceeds the diagnostic threshold value 640, a fault of the internal combustion engine 110 may be present.

From the fourth diagram 600, it can be seen that at a certain point in time the diagnostic value 630 exceeds the diagnostic threshold value 640. Once the diagnostic value 630 exceeds the diagnostic threshold value 640, a check is made to determine which gear in the transmission unit 150 (not shown) was engaged during the diagnosis. If it is identified that the gear in the transmission unit 150 which triggers the low-frequency oscillation effects was engaged, then a blocking of the function in eighth gear 670 is requested in the transmission unit. This blocking is shown in the fourth diagram 600 by way of the profile 670. It can be seen here that the eighth gear is blocked as soon as the diagnostic value 630 exceeds the diagnostic threshold value 640. There is no immediate gear change according to this example, since the driving commands of a driver do not allow this. The dynamics of the powertrain or the driver's request are shown in the fourth diagram 600 in the profile 660. It can be seen here that as soon as the driver's wish requests acceleration (evident from the local peak in the profile 660), then a corresponding request for a gear change occurs. This request for a gear change is shown in the fourth diagram 600 with the profile 680. This request to the transmission unit 150 to change the corresponding gear is sent, for example, from an engine control unit to a transmission control unit. Accordingly, the transmission circuit is activated to change gear. This activation of the transmission circuit is shown in the fourth diagram 600 in the profile 650. Once the transmission control unit has performed the gear change, the diagnosis of the internal combustion engine 110 may be performed again. This release is shown in the fourth diagram 600 with the reference sign 690. In this regard, it can be seen from the corresponding course of the diagnostic value 630 that the corresponding diagnostic value 630 after release 690 is below the diagnostic threshold value 640, so that it is identified that the internal combustion engine 110 does not have a fault. Overall, according to the present disclosure, the influence of the low-frequency oscillation effects on the diagnosis of the internal combustion engine 110 can be avoided by only performing an active diagnosis and can lead to a corresponding fault entry if the transmission unit 150 has a diagnostic gear that does not correspond to the predefined gears.

Figure 6:
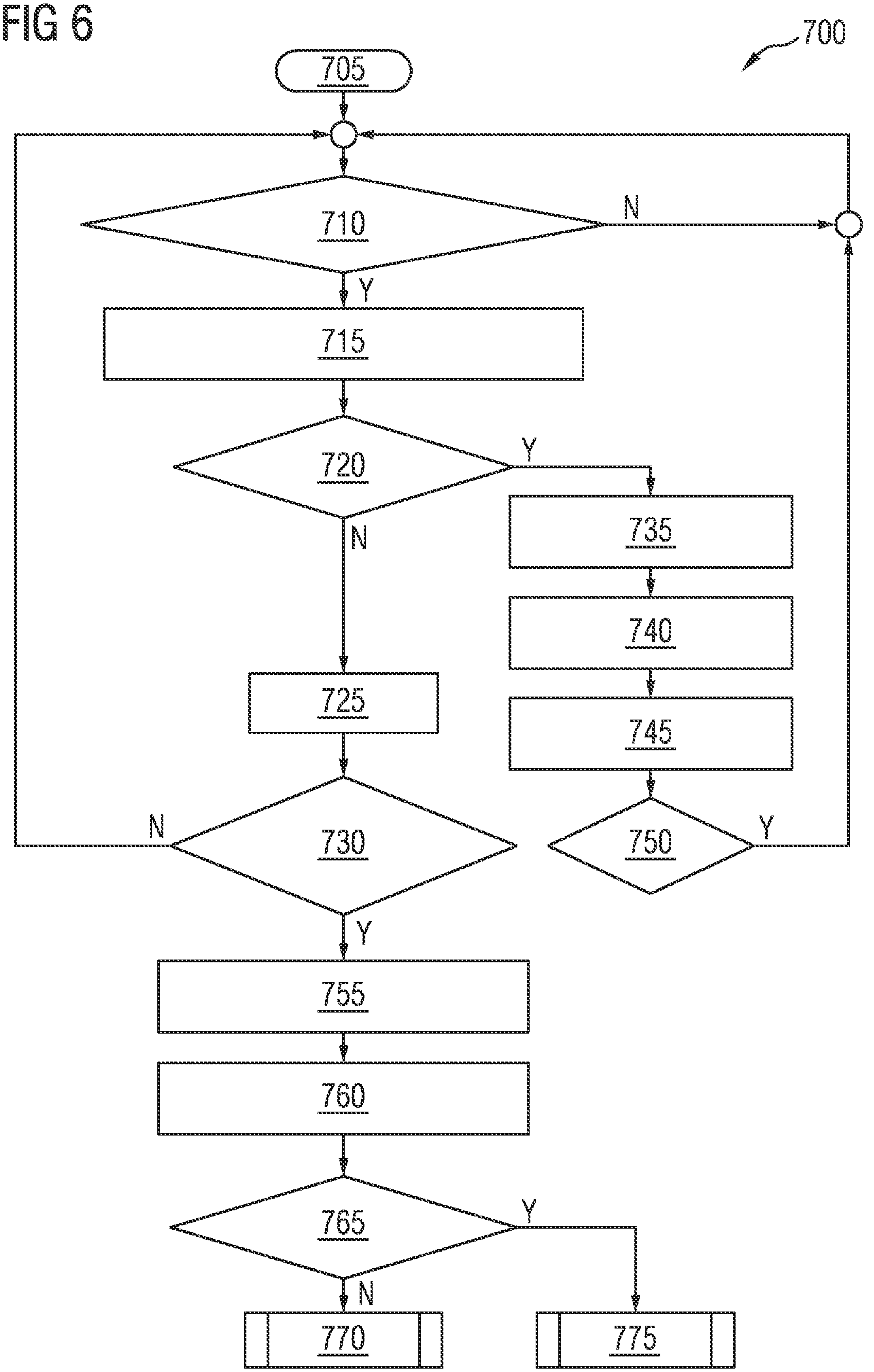
FIG. 6 shows a block diagram.

FIG. 6 shows a block diagram 700 depicting a sequence of the method of the present disclosure. First, the method starts. This is shown in the block diagram 700 with block 705. Then, it is checked whether activation conditions for performing the diagnosis of the internal combustion engine are satisfied. This is shown in the block diagram 700 with block 710. If yes, the method is continued, and if no, the method is terminated. In the block diagram 700, a "yes" branch is shown with Y and a "no" branch is shown with N. If the activation conditions are fulfilled accordingly, all cylinders are made leaner progressively and the resulting filtered running irregularity signals are evaluated accordingly. The diagnostic value 630 (not shown) for each cylinder is ascertained accordingly from the evaluation of the filtered running irregularity signals. This ascertainment is shown in the block diagram 700 with block 715. In the following steps, it is checked which diagnostic gears were engaged or active during the ascertainment of the diagnostic value. It is checked whether the diagnostic value is above the diagnostic threshold value. This check is performed if one of the diagnostic gears used corresponds to one of the predetermined gears. This is shown in the block diagram 700 with block 720. If a diagnostic value greater than the diagnostic threshold value has been determined with the involvement of at least one of the predetermined gears, further diagnostics in the predetermined gears is subsequently deactivated. This is shown in the block diagram 700 with block 735. Subsequently, a gear change is requested by the engine control unit. This gear change is shown in the block diagram 700 with block 740. This requested gear change is subsequently executed by the transmission control unit. This executed gear change is shown in the block diagram 700 with block 745. Once the gear change has been executed, the diagnosis can be executed again. This is shown in the block diagram 700 with block 750.

If the diagnostic value 630 exceeds the diagnostic threshold value 640 and the diagnostic gear does not correspond to one of the specified gears, the cycle counter is increased. This increase of the cycle counter causes the next diagnostic cycle to be started. This increase of the cycle counter is shown in the block diagram 700 with block 725 and block 730. As soon as the cycle counter has reached the maximum, i.e., as soon as the diagnosis has been carried out completely, the gear shift request from the motor control unit to the transmission control unit is withdrawn. This reset is shown schematically in the block diagram 700 with block 755. The transmission control unit then switches back to the normal program. This switch-back is shown in the block diagram 700 with block 760. Subsequently, it is checked whether the result of the diagnosis is above an error threshold. This error threshold can, for example, be somewhat higher than the diagnostic threshold value 640 in order to reproduce tolerances or other deviations, for example. This comparison is shown in the block diagram 700 with block 765. Provided that the diagnostic value is above this error threshold, an error has been identified by way of the diagnosis, and processing of this error follows. For example, an error entry may be made in the engine control unit, whereupon, for example, the vehicle is to be taken to the workshop for inspection and rectification of the error. This error identification is shown in the block diagram 700 with block 775. Accordingly, provided that the diagnostic value is not above the fault threshold, there is no fault in the internal combustion engine, and therefore the internal combustion engine can continue to be operated without restriction. This identification is shown schematically in the block diagram 700 with block 770. The method ends with the evaluation of whether the diagnostic value is above the fault threshold value. Overall, according to this example, a diagnosis of the internal combustion engine 110 and in particular a diagnosis of the respective cylinders of the internal combustion engine 110 can be performed depending in each case on the gear present in the transmission unit 150 during the diagnosis. As a result, the low-frequency oscillation effects can be filtered out during the diagnosis of the internal combustion engine 110. Overall, according to this example, the operating range of the internal combustion engine 110 during which the diagnosis of the internal combustion engine 110 is performed can be increased considerably compared to conventional diagnoses, since a gear change can be actively requested in order to complete the diagnosis, whereas this is not possible with conventional internal combustion engines.

A number of implementations have been described. Nevertheless, it will be understood that various modifications may be made without departing from the spirit and scope of the disclosure. Accordingly, other implementations are within the scope of the following claims.

What is claimed is:

1. A method for diagnosing an internal combustion engine of a powertrain, the powertrain includes the internal combustion engine and a transmission unit, the diagnosis is carried out using a running irregularity signal, the method comprising:

ascertaining a diagnostic value of the internal combustion engine during operation using the running irregularity signal of the internal combustion engine, wherein the powertrain is operated using a diagnostic gear of the transmission unit;

detecting the diagnostic gear which is engaged in the transmission unit while ascertaining the diagnostic value; and comparing the ascertained diagnostic value with a predefined diagnostic threshold value and comparing the diagnostic gear of the transmission unit with at least one predefined gear of the transmission unit;

identifying that the diagnosis of the internal combustion engine is reliable and there is a fault of the internal combustion engine if the ascertained diagnostic value exceeds the predefined diagnostic threshold value and at the same time the diagnostic gear of the transmission unit differs from all of the predefined gears of the transmission unit, or identifying that the diagnosis of the internal combustion engine is unreliable if the ascertained diagnostic value exceeds the predefined diagnostic threshold value and at the same time the diagnostic gear of the transmission unit corresponds to one of the predefined gears of the transmission unit.

2. The method of claim 1, wherein the ascertainment of the diagnostic value is repeated if a gear change has been performed by the transmission unit, and wherein it is identified that the diagnosis of the internal combustion engine is reliable and there is the fault if the diagnostic value ascertained during the repetition exceeds the predefined diagnostic threshold value and at the same time the diagnostic gear of the transmission unit differs from all of the predefined gears of the transmission unit.

3. The method of claim 1, wherein a gear change request is actively sent to the transmission unit if the ascertained diagnostic value exceeds the predefined diagnostic threshold value and at the same time the diagnostic gear of the transmission unit corresponds to one of the predefined gears of the transmission unit.

4. The method of claim 3, wherein the predefined gears are blocked by the transmission unit until the ascertainment of the diagnostic value is completed in a gear different from the predefined gears.

5. The method of claim 4, wherein the gear change and/or the gear block of the transmission unit are performed in dependence on driver requirements or powertrain requirements.

6. The method of claim 1, wherein a cylinder-specific diagnostic value is ascertained by a cylinder-specific running irregularity signal for each individual cylinder of the internal combustion engine.

7. The method of claim 6, wherein, during a predefined first time period, one of the cylinders of the internal combustion engine is made leaner in comparison to other cylinders of the internal combustion engine and the cylinder-specific running irregularity signal detected during this first time period is used to ascertain the cylinder-specific diagnostic value of the corresponding cylinder.

8. The method of claim 1, wherein an input is entered into a fault memory if it is identified that the diagnosis of the internal combustion engine is reliable and there is the fault, and wherein the input is left out of the fault memory if it is identified that the diagnosis of the internal combustion engine is unreliable.

9. A device for diagnosing an internal combustion engine of a powertrain, wherein the powertrain has the internal combustion engine and a transmission unit, and the diagnosis is made by a running irregularity signal, the device comprising:

a control unit designed to carry out a method comprising:

ascertaining a diagnostic value of the internal combustion engine during operation using the running irregularity signal of the internal combustion engine, wherein the powertrain is operated using a diagnostic gear of the transmission unit;

detecting the diagnostic gear which is engaged in the transmission unit while ascertaining the diagnostic value; and comparing the ascertained diagnostic value with a predefined diagnostic threshold value and comparing the diagnostic gear of the transmission unit with at least one predefined gear of the transmission unit;

identifying that the diagnosis of the internal combustion engine is reliable and there is a fault of the internal combustion engine if the ascertained diagnostic value exceeds the predefined diagnostic threshold value and at the same time the diagnostic gear of the transmission unit differs from all of the predefined gears of the transmission unit, or identifying that the diagnosis of the internal combustion engine is unreliable if the ascertained diagnostic value exceeds the predefined diagnostic threshold value and at the same time the diagnostic gear of the transmission unit corresponds to one of the predefined gears of the transmission unit.

10. The device of claim 9, wherein the ascertainment of the diagnostic value is repeated if a gear change has been performed by the transmission unit, and wherein it is identified that the diagnosis of the internal combustion engine is reliable and there is the fault if the diagnostic value ascertained during the repetition exceeds the predefined diagnostic threshold value and at the same time the diagnostic gear of the transmission unit differs from all of the predefined gears of the transmission unit.

11. The device of claim 9, wherein a gear change request is actively sent to the transmission unit if the ascertained diagnostic value exceeds the predefined diagnostic threshold value and at the same time the diagnostic gear of the transmission unit corresponds to one of the predefined gears of the transmission unit.

12. The device of claim 11, wherein the predefined gears are blocked by the transmission unit until the ascertainment of the diagnostic value is completed in a gear different from the predefined gears.

13. The device of claim 12, wherein the gear change and/or the gear block of the transmission unit are performed in dependence on driver requirements or powertrain requirements.

14. The device of claim 9, wherein a cylinder-specific diagnostic value is ascertained by a cylinder-specific running irregularity signal for each individual cylinder of the internal combustion engine.

15. The device of claim 14, wherein, during a predefined first time period, one of the cylinders of the internal combustion engine is made leaner in comparison to other cylinders of the internal combustion engine and the cylinder-specific running irregularity signal detected during this first time period is used to ascertain the cylinder-specific diagnostic value of the corresponding cylinder.

16. The device of claim 9, wherein an input is entered into a fault memory if it is identified that the diagnosis of the internal combustion engine is reliable and there is the fault, and wherein the input is left out of the fault memory if it is identified that the diagnosis of the internal combustion engine is unreliable.

* * * * *